(12) United States Patent
Zhang

(10) Patent No.: US 10,621,393 B2
(45) Date of Patent: Apr. 14, 2020

(54) CARD TRAY, CARD CONNECTING APPARATUS AND MOBILE TERMINAL

(71) Applicant: ZTE CORPORATION, Guangdong (CN)

(72) Inventor: Lei Zhang, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 183 days.

(21) Appl. No.: 15/737,218

(22) PCT Filed: Jan. 26, 2016

(86) PCT No.: PCT/CN2016/072157
§ 371 (c)(1),
(2) Date: Dec. 15, 2017

(87) PCT Pub. No.: WO2016/201986
PCT Pub. Date: Dec. 22, 2016

(65) Prior Publication Data
US 2018/0173904 A1    Jun. 21, 2018

(30) Foreign Application Priority Data

Jun. 16, 2015 (CN) .......................... 2015 1 0334569

(51) Int. Cl.
*G06K 7/00* (2006.01)
*H04M 1/02* (2006.01)
(Continued)

(52) U.S. Cl.
CPC ........... *G06K 7/0056* (2013.01); *G06K 13/08* (2013.01); *H04B 1/3816* (2013.01); *H04M 1/02* (2013.01);
(Continued)

(58) Field of Classification Search
CPC .... H01R 13/62; G06K 7/0056; G06K 7/0021; G06K 13/08; G06K 13/0825; G06K 13/0831; G06K 13/0856
See application file for complete search history.

(56) References Cited

U.S. PATENT DOCUMENTS

RE35,938 E * 10/1998 O'Brien ................. G06K 13/08
439/160
7,112,075 B1    9/2006 Su
(Continued)

FOREIGN PATENT DOCUMENTS

CN    201601270 U    10/2010
CN    201966408 U  *  9/2011
(Continued)

OTHER PUBLICATIONS

International Search Report dated Apr. 1, 2016 for International Application No. PCT/CN2016/072157, 5 pages.
(Continued)

*Primary Examiner* — Abdullah A Riyami
*Assistant Examiner* — Nader J Alhawamdeh
(74) *Attorney, Agent, or Firm* — Knobbe Martens Olson & Bear LLP

(57) ABSTRACT

Disclosed are a card tray, a card connecting apparatus and a mobile terminal. The card connecting apparatus includes a card tray and a base. The base is configured to contain the card tray. The card tray includes an ejecting mechanism and a card carrying mechanism. The card carrying mechanism is provided with a sliding cavity. The ejecting mechanism includes a pull rod slidably arranged in the sliding cavity to form a card-rod separated structure that the ejecting mechanism is capable of pushing the card carrying mechanism into the base or pulling out the card carrying mechanism from the base and also capable of being ejected alone when the card carrying mechanism is clamped in the working position by the base.

9 Claims, 3 Drawing Sheets

(51) Int. Cl.
*G06K 13/08* (2006.01)
*H04B 1/3816* (2015.01)
(52) U.S. Cl.
CPC .......... *H04M 1/026* (2013.01); *G06K 7/0021* (2013.01); *G06K 13/0825* (2013.01); *G06K 13/0831* (2013.01); *G06K 13/0856* (2013.01)

(56) References Cited

U.S. PATENT DOCUMENTS

| | | | | |
|---|---|---|---|---|
| 2009/0191757 | A1* | 7/2009 | Tochi | G06K 19/077 439/607.31 |
| 2016/0266619 | A1* | 9/2016 | Heiskanen | G06F 1/1656 |

FOREIGN PATENT DOCUMENTS

| | | |
|---|---|---|
| CN | 201966408 U | 9/2011 |
| CN | 203932484 U | 11/2014 |
| CN | 204069071 U | 12/2014 |
| JP | 2014229541 A | 12/2014 |

OTHER PUBLICATIONS

Written Opinion of the International Searching Authority dated Apr. 1, 2016 for International Application No. PCT/CN2016/072157, 3 pages.

* cited by examiner

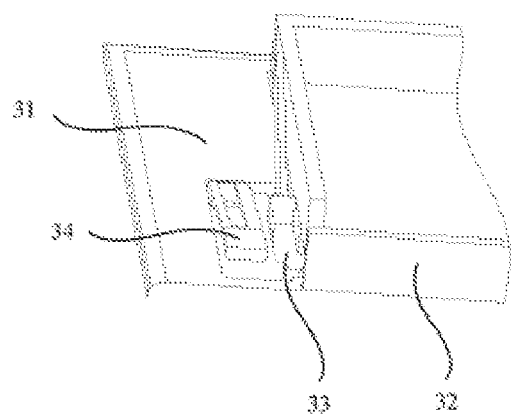
FIG. 5
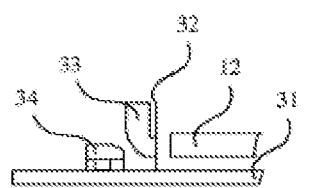 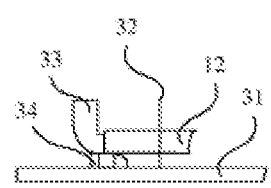 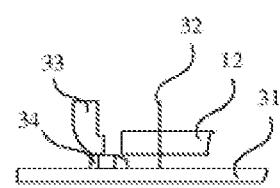
FIG. 6a    FIG. 6b    FIG. 6c

CARD TRAY, CARD CONNECTING APPARATUS AND MOBILE TERMINAL

CROSS REFERENCE TO RELATED APPLICATIONS

This application is the U.S. National Phase Application under 35 U.S.C. § 371 of International Application No. PCT/CN2016/072157 filed on Jan. 26, 2016, designating the U.S. and published as WO 2016/201986 A1 on Dec. 22, 2016, which claims the benefit of Chinese Patent Application No. 201510334569.6, filed Jun. 16, 2015, both of which are hereby incorporated by reference in their entirety.

TECHNICAL FIELD

Embodiments of the present invention relate to, but not limited to the field of wireless communication, and particularly relate to a card tray, a card connecting apparatus and a mobile terminal with the card connecting apparatus.

BACKGROUND

At present, a relevant intelligent mobile terminal generally adopts a lateral card tray type card connecting apparatus to adapt to development trends and market demands of thinning and integration of a mobile terminal. The relevant lateral card tray type card connecting apparatus is generally comprised of a card tray and a base. The card tray carries a user card (such as an SIM card) and slides in the base. The base contains the card tray, and locks or ejects the card tray.

According to a locked or ejected structure of the card tray, current common card connecting apparatuses can be divided into a needle poking structure and a self-locking structure. The needle poking structure is a structure locking mode. When a user card is installed, the card tray is pushed in the base of the mobile terminal and a locking component in the base clamps the card tray in the base. When the user card is to be taken out, a special tool (such as a thimble) is inserted into an unlocking hole (such as a thimble hole) formed in a housing of the mobile terminal and the special tool pushes the locking component to release a clamped state of the card tray so that the card tray slides out of the base. The self-locking structure is also called as a Push-Push mode, and is to press the card tray once to lock the card tray after the card tray is pushed in the base and then to press the card tray once more to eject the card tray.

Practical use indicates that although the needle poking structure has advantages of reliable card fixation and the like, the mode requires a user to carry the special tool at any time; otherwise, the user card cannot be taken out, not only causing inconvenient operation, but also affecting user experience. In addition, although the self-locking structure has the advantages of convenient operation and the like, the mode has a defect of easily false triggering of card return. For example, when the mobile terminal accidentally falls on the ground, impact of external force enables the card tray to drive the user card to eject from the base. For another example, when the user uses the mobile terminal, the card tray may be pressed by mistake, causing that the card tray drives the user card to eject from the base. The defect of easily false triggering of card return in the self-locking structure may cause communication interruption, cause errors in data and information and seriously affect normal use of the mobile terminal.

SUMMARY

The following is a summary of subject matter that is described in detail herein. This summary is not intended to limit a protection range of claims.

Embodiments of the present invention provide a card tray, including an ejecting mechanism and a card carrying mechanism, where the card carrying mechanism is provided with a sliding cavity, the ejecting mechanism includes a pull rod slidably arranged in the sliding cavity and is configured as a card-rod separated structure that the ejecting mechanism is capable of driving the card carrying mechanism to move together and capable of moving alone when the card carrying mechanism is not moved.

Optionally, a limiting groove is further arranged in the card carrying mechanism; and the limiting groove is configured to clamp the card carrying mechanism in a working position when the pull rod is moved alone.

Optionally, the card carrying mechanism includes a card carrying panel and a supporting plate; a carrying hole for containing a user card is provided in the card carrying panel; and the supporting plate is arranged below the card carrying panel, is configured to support the user card in the carrying hole and is also configured to form the sliding cavity with the card carrying panel.

Optionally, the supporting plate is further configured to form a locating slot with the card carrying panel; the ejecting mechanism further includes a locating block configured to fixedly connect with the pull rod; and the locating block is slidably arranged in the locating slot and is configured to limit a sliding direction and a sliding stroke of the pull rod so that the ejecting mechanism is capable of driving the card carrying mechanism to move together.

Embodiments of the present invention further provide a card connecting apparatus, including a card tray and a base, where the base is configured to contain the card tray, the card tray includes an ejecting mechanism and a card carrying mechanism, the card carrying mechanism is provided with a sliding cavity, the ejecting mechanism includes a pull rod slidably arranged in the sliding cavity and is configured as a card-rod separated structure that the ejecting mechanism is capable of pushing the card carrying mechanism into the base or pulling out the card carrying mechanism from the base and also capable of being ejected alone when the card carrying mechanism is clamped in a working position by the base.

Optionally, the base includes a position clamping mechanism and a self-locking mechanism; a limiting groove is further provided in the card carrying mechanism; the self-locking mechanism is configured to lock or eject the pull rod; the position clamping mechanism is configured to match with the limiting groove, and to clamp the card carrying mechanism in the working position when the pull rod is ejected by the self-locking mechanism.

Optionally, the card carrying mechanism includes a card carrying panel and a supporting plate; a carrying hole for containing a user card is provided in the card carrying panel; and the supporting plate is arranged below the card carrying panel, is configured to support the user card in the carrying hole and is configured to form the sliding cavity with the card carrying panel.

Optionally, the supporting plate is further configured to form a locating slot with the card carrying panel; the ejecting mechanism further includes a locating block configured to fixedly connect with the pull rod; and the locating block is slidably arranged in the locating slot and is configured to limit a sliding direction and a sliding stroke of the pull rod so that the ejecting mechanism is capable of pushing the card carrying mechanism into the base or pulling out the card carrying mechanism from the base.

Optionally, the base further includes a main supporting surface and card tray supporting ribs; and the card tray supporting ribs are arranged at both sides and a distal end of the main supporting surface and form a space for containing the card tray.

Embodiments of the present invention further provide a mobile terminal, including a housing and a card connecting apparatus. The card connecting apparatus is arranged on a side surface of the housing. The card connecting apparatus adopts the above card connecting apparatus.

Embodiments of the present invention provide a card tray, a card connecting apparatus and a mobile terminal. The card-rod separated structure for the ejecting mechanism and the card carrying mechanism not only overcomes the defect of easily false triggering of card return in the relevant self-locking structure, but also overcomes the deficiencies of inconvenient operation and affecting user experience in the relevant needle poking structure, and has the advantages of simple structure, low cost, convenient operation, reliable locking and clamping and the like.

Other aspects will be appreciated upon reading and understanding the accompanying figures and detailed description.

BRIEF DESCRIPTION OF DRAWINGS

FIG. 5 is a structural schematic diagram of a self-locking mechanism in a base in an embodiment of the present invention.

FIG. 6a, FIG. 6b and FIG. 6c are working schematic diagrams of an ejecting mechanism in an embodiment of the present invention.

DETAILED DESCRIPTION

To facilitate understanding of those skilled in the art, embodiments of the present invention are further described below in combination with drawings, and are not used to limit a protection scope of the present invention. It should be noted that embodiments in the present application and various modes in embodiments can be combined mutually without conflict.

Figure 1:
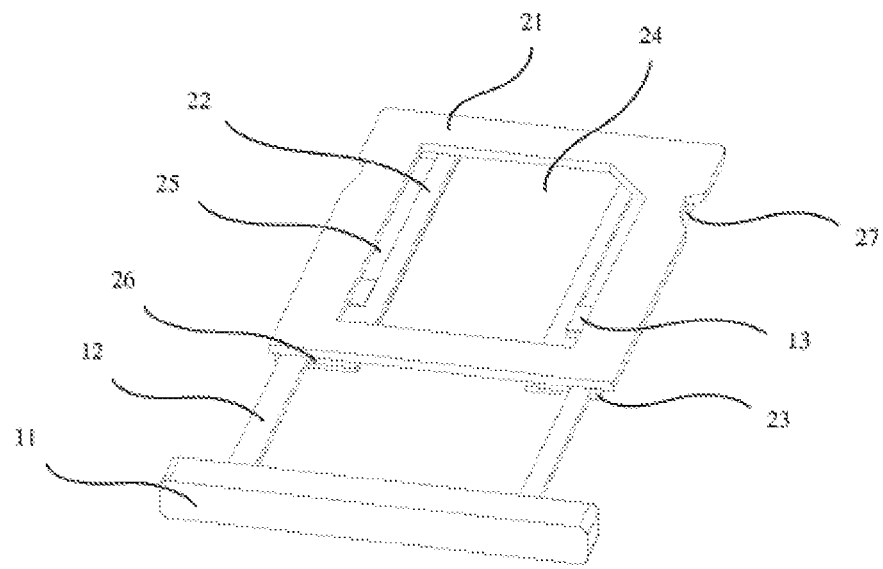
FIG. 1 is a structural schematic diagram of a card tray when the card tray is in a state that a pull rod is ejected in an embodiment of the present invention.
Figure 2:
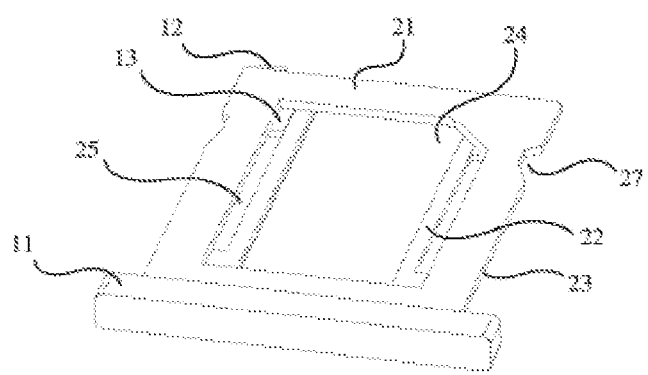
FIG. 2 is a structural schematic diagram of a card tray when the card tray is in a state that a pull rod is closed in an embodiment of the present invention.

In embodiments of the present invention, as shown in FIG. 1 and FIG. 2, a main structure of the card tray includes an ejecting mechanism and a card carrying mechanism. The card carrying mechanism is configured to carry a user card (such as an SIM card). The ejecting mechanism is configured to push in or pull out the card carrying mechanism. A sliding cavity 26 is arranged on the card carrying mechanism. The ejecting mechanism includes a pull rod 12. The pull rod 12 is slidably arranged in the sliding cavity 26 to form a card (user card)-rod (pull rod) separated structure that the ejecting mechanism is capable of driving the card carrying mechanism to move together and also capable of moving alone when the card carrying mechanism is not moved.

Optionally, the ejecting mechanism of the card tray in the present embodiment further includes an end cover 11 and a locating block 13. The card carrying mechanism includes a card carrying panel 21, a supporting plate 22 and a side plate 23. The card carrying panel 21 in the card carrying mechanism is a rectangular frame structure in which a carrying hole 24 is formed. A shape of the carrying hole 24 is adapted to a shape of the user card, and the carrying hole 24 is configured to contain the user card. The supporting plate 22 is a strip-shaped frame structure. Two supporting plates 22 are respectively arranged below two side frames of the card carrying panel 21, and are matched with the card carrying panel 21 to respectively form a locating slot 25 and a sliding cavity 26. Specifically, an inner side frame of the supporting plate 22 is located within a range of the carrying hole 24. On one hand, the inner side frame is configured to support the user card placed in the carrying hole 24, and on the other hand, the inner side frame and a side frame of the card carrying panel 21 form a strip-shaped locating slot 25. The locating slot 25 is configured to contain the locating block 13 of the ejecting mechanism to enable the locating block 13 to slide in the locating slot 25, and configured to limit a sliding direction and a sliding stroke of the locating block 13 so as to limit a sliding direction and a sliding stroke of the pull rod 12. The outer side frame of the supporting plate 22 is matched with the side plate 23 and the side frame of the card carrying panel 21 to form a semi-closed sliding cavity 26. The sliding cavity 26 is configured to contain the pull rod 12 of the ejecting mechanism so that the pull rod 12 slides in the sliding cavity 26. Limiting grooves 27 are also respectively formed in both sides of the card carrying mechanism. The limiting grooves 27 are configured to limit movement of the card carrying mechanism, and are configured in such a manner that the card carrying mechanism which carries the user card is clamped in a working position when the pull rod 12 (the ejecting mechanism) is moved alone.

Optionally, two pull rods 12 in the ejecting mechanism in the present embodiment are slidably arranged in two sliding cavities 26 of the card carrying mechanism respectively. Proximal ends of the two pull rods 12 are fixedly connected with the end cover 11, and are driven by the end cover 11 to slide in the sliding cavities 26. The locating block 13 is further fixedly connected to each pull rod 12. The locating block 13 is slidably arranged in the locating slot 25 of the card carrying mechanism and is configured to limit a sliding direction and a sliding stroke of the pull rod 12.

In the above structure of the card tray in the present embodiment, since the pull rod 12 is slidably arranged in the sliding cavity 26, when the card carrying mechanism is in the working position, the ejecting mechanism including the end cover 11, the pull rod 12 and the locating block 13 can move alone to form a card (user card)-rod (pull rod) separated structure that the card carrying mechanism is not moved while the ejecting mechanism moves alone. Meanwhile, since the locating block 13 can limit a sliding direction and a sliding stroke of the pull rod 12, when the pull rod 12 slides to a set sliding stroke, the ejecting mechanism including the end cover 11, the pull rod 12 and the locating block 13 can drive the card carrying mechanism to move together against limitation of the limiting groove, and push in or pull out the card carrying mechanism.

In the card tray of the present embodiment, the ejecting mechanism and the card carrying mechanism are designed into a card-rod separated structure, so that not only the ejecting mechanism drives the card carrying mechanism to move together, but also the card carrying mechanism is not moved while the ejecting mechanism moves alone, thereby effectively overcoming a defect of easily false triggering in a relevant technology.

Figure 3:
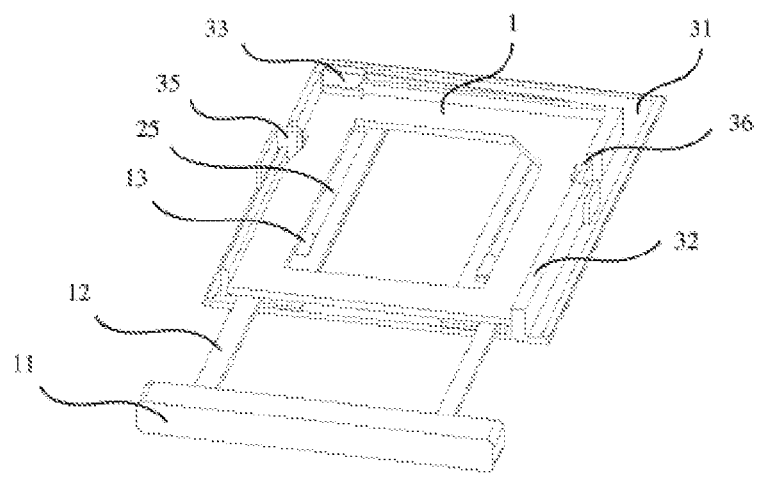
FIG. 3 is a structural schematic diagram of a card connecting apparatus when the card connecting apparatus is in a state that a pull rod is ejected in an embodiment of the present invention.
Figure 4:
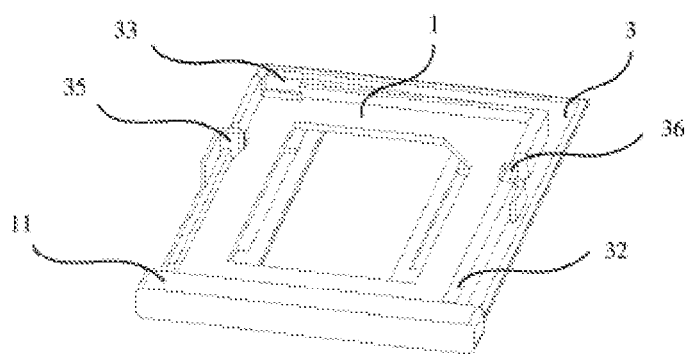
FIG. 4 is a structural schematic diagram of a card connecting apparatus when the card connecting apparatus is in a state that a pull rod is closed in an embodiment of the present invention.

In another specific example of embodiments of the present invention, as shown in FIG. 3 and FIG. 4, a main structure of a card connecting apparatus includes a card tray 1 and a base 3. The base 3 is configured to contain the card tray 1. The card tray 1 is configured to carry a user card (such as an SIM card). The card tray 1 adopts a card tray structure disclosed in above embodiments to form a card-rod separated structure that the ejecting mechanism can push the card carrying mechanism into the base or pull out the card carrying mechanism from the base and can also be ejected alone when the card carrying mechanism is clamped in a working position by the base.

Optionally, the base 3 in the present embodiment includes a main supporting surface 31, card tray supporting ribs 32, a self-locking mechanism and a position clamping mechanism. The main supporting surface 31 is a rectangular plate structure. The card tray supporting ribs 32 are respectively arranged at both sides and a distal end of the main supporting surface 31. A semi-closed region formed by three card tray supporting ribs 32 is configured into a space for containing the card tray 1. The self-locking mechanism and the position clamping mechanism in the present embodiment can adopt a self-locking structural form and a position clamping structural form of a relevant Push-Push card connecting apparatus. As shown in FIG. 5, the self-locking mechanism includes a swinging rod 33 and a pressing piece 34. The swinging rod 33 is driven by the pull rod 12 to move forwards and backwards along a sliding direction of the pull rod 12. The pressing piece 34 is driven by the swinging rod 33 to move upwards and downwards in a direction perpendicular to the main supporting surface 31. The pull rod 12 is locked through frictional positioning between the swinging rod 33 and the pressing piece 34, i.e., the ejecting mechanism of the card tray 1 is locked. The position clamping mechanism includes clamping grooves 35 and clamping spring reeds 36. The clamping grooves 35 are respectively arranged on two card tray supporting ribs 32 parallel with the pull rod 12. The clamping spring reeds 36 are arranged in the clamping grooves 35. The clamping spring reeds 36 are configured to matched with the limiting groove 27 of the card tray 1 to limit movement of the card carrying mechanism. In practical use, a seat cover can also be arranged on the base in the present embodiment.

When the ejecting mechanism is in an ejected state, the end cover 11 is pushed and the pull rod 12 is driven by external force to move to the left side (towards the self-locking mechanism) and to push the swinging rod 33 to move together. When the swinging rod 33 comes into contact with the pressing piece 34, the swinging rod 33 drives the pressing piece 34 to move downwards. When the swinging rod 33 drives the pressing piece 34 to a certain position (for example, the swinging rod 33 moves to half of a width of the pressing piece 34 or the pressing piece 34 is pressed by half of a height), static frictional force between the swinging rod 33 and the pressing piece 34 enables positions of the swinging rod 33 and the pressing piece 34 to be fixed relatively and to be in a locked state. When the ejecting mechanism is in a locked state, the end cover 11 is pushed; the pull rod 12 is driven by external force to move to the left side and touch the swinging rod 33; and restoring force of the swinging rod 33 enables the swinging rod 33 to move to the right side (towards the end cover 11) against dynamic frictional force between the swinging rod 33 and the pressing piece 34, and pushes the pull rod 12 to be ejected to the right so that the ejecting mechanism is in a released and ejected state, as shown in FIG. 6a, FIG. 6b and FIG. 6c.

When the user needs to take out the user card, the end cover 11 is pressed; the end cover 11 drives the pull rod 12 to move towards the self-locking mechanism of the base 3 and triggers the self-locking mechanism to unlock; and the pull rod 12 is ejected towards the end cover 11 to form an ejected state of the pull rod, i.e., a state that the ejecting mechanism is released and ejected, as shown in FIG. 3. At this moment, since the card carrying mechanism of the card tray 1 is clamped by the clamping spring reeds 36 of the base 3, the card carrying mechanism which carries the user card does not move and is still in an original working position. The user further pulls the end cover 11. After the locating block 13 slides to a proximal end part of the locating slot 25, the locating block 13 drives the card carrying mechanism to move together. The pull force of the user enables the card carrying mechanism to be free from the limitation of the clamping spring reeds 36, so as to pull out the card carrying mechanism which carries the user card.

When the user needs to load the user card, the user card is placed in the carrying hole 24 of the card carrying mechanism. The end cover 11 is pushed and the end cover 11 drives the pull rod 12 to move towards the self-locking mechanism of the base 3. After the locating block 13 slides to a distal end part of the locating slot 25, the locating block 13 drives the card carrying mechanism to move together, and the card carrying mechanism is pushed in the base 3 and clamped by the clamping spring reeds 36. The end cover 11 is further pressed; and the pull rod 12 triggers the self-locking mechanism to lock to complete installation of the user card, as shown in FIG. 4.

In practical use, when a mobile terminal accidentally falls to the ground, impact force applied to the end cover 11 may drive the end cover 11 to push the pull rod 12 to move so that the ejecting mechanism is released and ejected. However, since the card carrying mechanism which carries the user card is clamped by the clamping spring reeds 36 of the base 3 and is stilled in the working position, false trigger of card return is avoided, the communication is not interrupted and the normal use of the mobile terminal is not affected. The user resets the ejecting mechanism to the original position after picking up the mobile terminal.

In practical use, when the end cover 11 is pressed by mistake by the user who uses the mobile terminal, only the ejecting mechanism is released and ejected, while the card carrying mechanism which carries the user card is stilled in the working position, thereby avoiding false trigger of card return, preventing communication interruption and avoiding affecting normal use of the mobile terminal.

In the card connecting apparatus provided in embodiments of the present invention, since the card tray with the card-rod separated structure is adopted, when the mobile terminal accidentally falls to the ground or the user presses by mistake, only the ejecting mechanism is released and ejected, while the card carrying mechanism which carries the user card is stilled in the working position, thereby effectively overcoming a defect of easily false triggering in a relevant self-locking structure, preventing communication interruption and avoiding affecting normal use of the mobile terminal. Meanwhile, since the self-locking mechanism and the position clamping mechanism adopt a structural form of a relevant Push-Push card connecting apparatus, which has advantages of convenient operation and the like, and effectively overcomes defects of inconvenient operation, affecting user experience and the like in a relevant needle poking structure.

In another specific example of embodiments of the present invention, the mobile terminal includes a housing and a card connecting apparatus disclosed in above embodiments and the card connecting apparatus is arranged on a side surface of the housing.

The above content is a further detailed description for the present invention in combination with specific embodiments. It should not be considered that the specific implementation of the present invention is only limited to the description.

INDUSTRIAL APPLICABILITY

Disclosed are a card tray, a card connecting apparatus and a mobile terminal. The card connecting apparatus includes a card tray and a base. The base is configured to contain the card tray. The card tray includes an ejecting mechanism and a card carrying mechanism. The card carrying mechanism is provided with a sliding cavity. The ejecting mechanism includes a pull rod slidably arranged in the sliding cavity to form the card-rod separated structure that the ejecting mechanism is capable of pushing the card carrying mechanism into the base or pulling out the card carrying mechanism from the base and also capable of being ejected alone when the card carrying mechanism is clamped in the working position by the base. In embodiments of the present invention, the card-rod separated structure for the ejecting mechanism and the card carrying mechanism not only overcomes the defect of easily false triggering of card return in the relevant self-locking structure, but also overcomes the deficiencies of inconvenient operation and affecting user experience in the relevant needle poking structure, and has the advantages of simple structure, low cost, convenient operation, reliable card locking and clamping and the like.

What is claimed is:

1. A card tray, comprising an ejector and a card carrier, wherein:
   the card carrier is provided with a sliding cavity; and
   the ejector comprises a pull rod slidably disposed in the sliding cavity, and further configured as a card-rod separated structure such that the ejector is configured to cause the card carrier to move together and cause to move alone when the card carrier is not moved;
   wherein the card carrier comprises a card carrying panel and a supporting plate; a carrying hole for containing a user card is provided in the card carrying panel; and the supporting plate is disposed below the card carrying panel and configured to support the user card in the carrying hole and to form the sliding cavity with the card carrying pane;
   wherein the supporting plate is further configured to form a locating slot with the card carrying panel; the ejector further comprises a locating block configured to fixedly connect with the pull rod; and the locating block is slidably disposed in the locating slot and is configured to limit a sliding direction and a sliding stroke of the pull rod such that the ejector is configured to cause the card carrier to move together.

2. The card tray according to claim 1, wherein a limiting groove is further disposed in the card carrier; and the limiting groove is configured to clamp the card carrier in a working position when the pull rod is moved alone.

3. A card connecting apparatus, comprising a card tray and a base, wherein:
   the base is configured to include the card tray; the card tray comprises an ejector and a card carrier; the card carrier is provided with a sliding cavity; and the ejector comprises a pull rod slidably disposed in the sliding cavity, and is configured as a card-rod separated structure such that the ejector is capable of pushing the card carrier into the base or pulling out the card carrier from the base and also capable of being ejected alone when the card carrier is clamped in a working position by the base;
   wherein the card carrier comprises a card carrying panel and a supporting plate; a carrying hole for containing a user card is provided in the card carrying panel; and the supporting plate is disposed below the card carrying panel and is configured to support the user card in the carrying hole and is configured to form the sliding cavity with the card carrying panel;
   wherein the supporting plate is further configured to form a locating slot with the card carrying panel; the ejector further comprises a locating block configured to fixedly connect with the pull rod; and the locating block is slidably disposed in the locating slot and is configured to limit a sliding direction and a sliding stroke of the pull rod such that the ejector is capable of pushing the card carrier into the base or pulling out the card carrier from the base.

4. The card connecting apparatus according to claim 3, wherein the base comprises a position damper and a self-locker; a limiting groove is further provided in the card carrier; the self-locker is configured to lock or eject the pull rod; the position damper is configured to match with the limiting groove, and to clamp the card carrier in the working position when the pull rod is ejected by the self-locker.

5. The card connecting apparatus according to claim 3, wherein the base further comprises a main supporting surface and card tray supporting ribs; and the card tray supporting ribs are disposed at both sides and a distal end of the main supporting surface and form a space for containing the card tray.

6. A mobile terminal, comprising a housing and a card connecting apparatus, wherein the card connecting apparatus is disposed on a side surface of the housing; and the card connecting apparatus comprises a card tray and a base;
   wherein the base is configured to contain the card tray; the card tray comprises an ejector and a card carrier; the card carrier is provided with a sliding cavity; and the ejector comprises a pull rod slidably disposed in the sliding cavity, and further configured as a card-rod separated structure such that the ejector is capable of pushing the card carrier into the base or pulling out the card carrier from the base and also is capable of being ejected alone when the card carrier is clamped in a working position by the base;
   wherein the card carrier comprises a card carrying panel and a supporting plate; a carrying hole for containing a user card is provided in the card carrying panel; and the supporting plate is disposed below the card carrying panel and configured to support the user card in the carrying hole and is configured to form the sliding cavity with the card carrying panel;
   wherein the supporting plate is further configured to form a locating slot with the card carrying panel; the ejector further comprises a locating block configured to fixedly connect with the pull rod; and the locating block is slidably disposed in the locating slot and is configured to limit a sliding direction and a sliding stroke of the pull rod such that the ejector is capable of pushing the card carrier into the base or pulling out the card carrier from the base.

7. The card connecting apparatus according to claim 4, wherein the base further comprises a main supporting surface and card tray supporting ribs; and the card tray supporting ribs are disposed at both sides and a distal end of the main supporting surface and form a space for containing the card tray.

8. The mobile terminal according to claim 6, wherein the base comprises a position damper and a self-locker; a limiting groove is further provided in the card carrier; the self-locker is configured to lock or eject the pull rod; the position damper is configured to match with the limiting groove, and to clamp the card carrier in the working position when the pull rod is ejected by the self-locker.

9. The mobile terminal according to claim 6, wherein the base further comprises a main supporting surface and card tray supporting ribs; and the card tray supporting ribs are disposed at both sides and a distal end of the main supporting surface and form a space for containing the card tray.

* * * * *